(12) United States Patent
Ward

(10) Patent No.: US 7,975,724 B2
(45) Date of Patent: Jul. 12, 2011

(54) HOSE BEND BLEEDER FOR AMMONIA APPLICATION SYSTEM

(76) Inventor: David P. Ward, Dallas, TX (US)

( * ) Notice: Subject to any disclaimer, the term of this patent is extended or adjusted under 35 U.S.C. 154(b) by 148 days.

(21) Appl. No.: 12/488,063

(22) Filed: Jun. 19, 2009

(65) Prior Publication Data

US 2010/0319794 A1 Dec. 23, 2010

(51) Int. Cl.
*F16K 11/04* (2006.01)
*F16L 55/00* (2006.01)
(52) U.S. Cl. ........................................ 137/886; 137/861
(58) Field of Classification Search ............. 137/561 R, 137/861, 886; 285/133.11
See application file for complete search history.

(56) References Cited

U.S. PATENT DOCUMENTS

| 1,859,251 | A | * | 5/1932 | Brown | 285/101 |
| 2,689,754 | A | * | 9/1954 | Dunton | 285/18 |
| 2,943,869 | A | * | 7/1960 | Nordin | 285/90 |
| 4,407,269 | A | * | 10/1983 | Hopper | 285/371 |
| 4,921,281 | A | * | 5/1990 | Taylor | 285/90 |
| 5,033,775 | A | * | 7/1991 | Matte et al. | 285/133.11 |
| 5,381,832 | A | * | 1/1995 | Mitsui | 137/886 |
| 7,156,123 | B2 | * | 1/2007 | Welker et al. | 137/886 |

* cited by examiner

*Primary Examiner* — John Rivell
(74) *Attorney, Agent, or Firm* — Daniel V. Thompson

(57) ABSTRACT

A hose bend bleeder is combined with first and second hoses, with the hose bend bleeder being located at the bottom of a bend in a flow path established by the hoses. The hose bend bleeder has a bleed screw and a downwardly facing exit passageway.

4 Claims, 3 Drawing Sheets

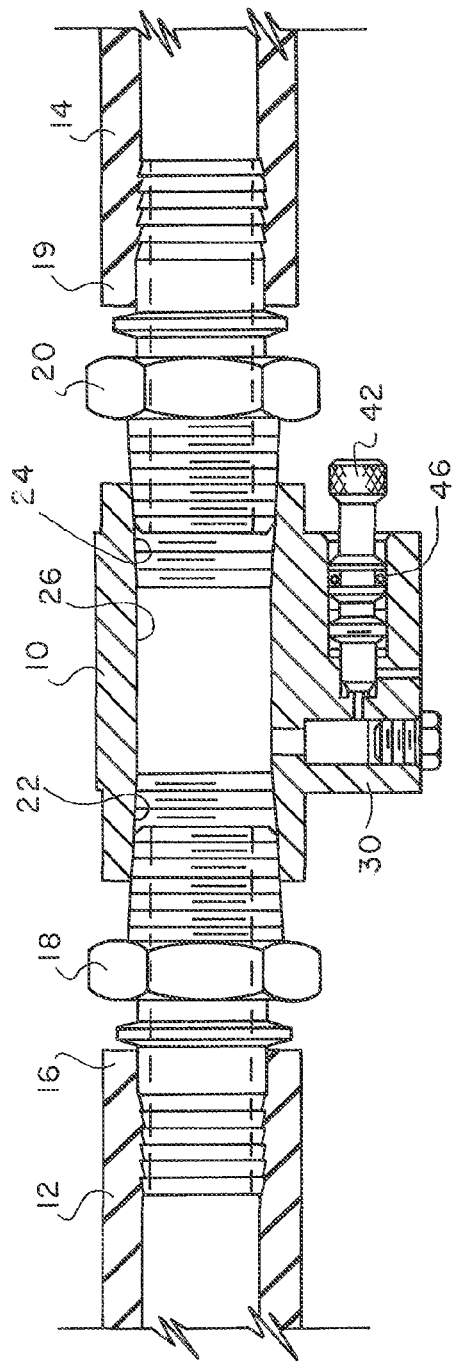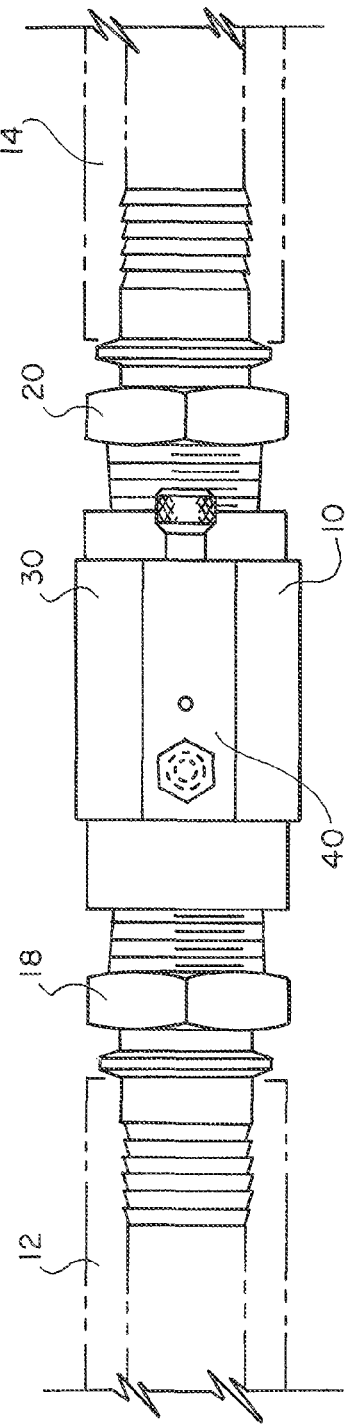
FIG. 3
FIG. 4

HOSE BEND BLEEDER FOR AMMONIA APPLICATION SYSTEM

BACKGROUND OF THE INVENTION

This invention relates to pressurized systems used in the transfer of product, through hoses, to pressure vessels. More particularly, the invention relates to equipment used in the transfer of agricultural ammonia from storage tanks and wagon-mounted nurse tanks, and provides a safety device for bleeding off undesired liquid ammonia at the bottom of a hose bend.

Liquid anhydrous ammonia (NH,) has long been used as a fertilizer for corn, grains and other crops. The typical ammonia application system consists of a nurse tank trailed behind a tool bar which is attached to a tractor. Application rate is controlled by a meter. The nurse tank is a trailer-mounted pressure vessel which contains the ammonia in its liquid state. The ammonia flows through a hose from the tank to the meter, then through more hose to one or more dividing manifolds, and finally through suitable hoses to the applicator knives which inject the ammonia into the soil. Hoses are used at ammonia storage facilities to fill empty nurse tanks.

With all the hoses involved in ammonia application, frequent disconnections are required, and standard procedure is to evacuate the liquid from the hose in order to minimize the amount of liquid lost during disconnection. At times, however, a relatively small amount of liquid ammonia will remain at the bottom of a bend in the hose due to gravity. As a final step before disconnection, it should be easy to bleed off any small amount of liquid at that location. Due to the extremely hazardous nature of ammonia, however, the relatively small amount of hose bend bleed off liquid must be directed away from the face of the technician doing the bleed off.

SUMMARY OF THE INVENTION

A hose bend bleeder is combined with first and second hoses, with the hose bend bleeder being located at the bottom of a bend in a flow path established by the hoses. The hose bend bleeder has a bleed screw and a downwardly facing exit passageway.

BRIEF DESCRIPTION OF THE DRAWINGS

A more complete understanding of the invention and its advantages will be apparent from the Detailed Description taken in conjunction with the accompanying Drawings, in which:

FIG. 3 is a sectional view taken along lines 3-3 of FIG. 2;

FIG. 4 is a bottom view of the ammonia hoses and hose bend bleeder; and

DETAILED DESCRIPTION

Figure 1:
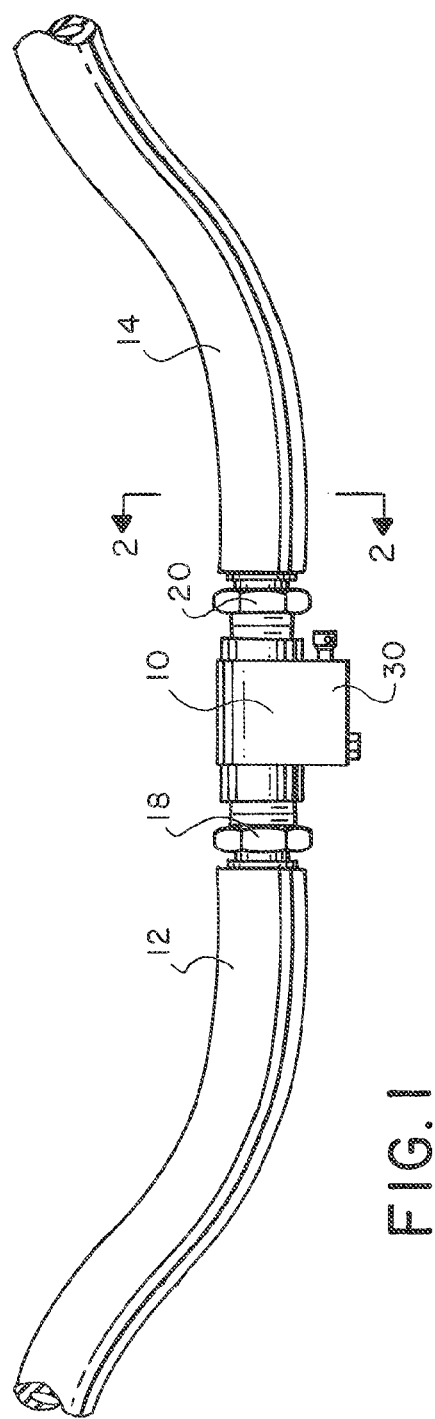
FIG. 1 is a side elevation view of the ammonia hoses and hose bend bleeder of the present invention.
Figure 2:
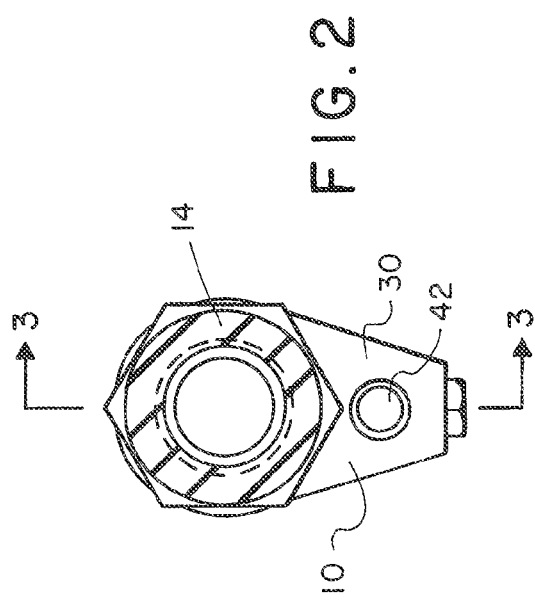
FIG. 2 is a sectional view taken along lines 2-2 of FIG. 1.
Figure 5:
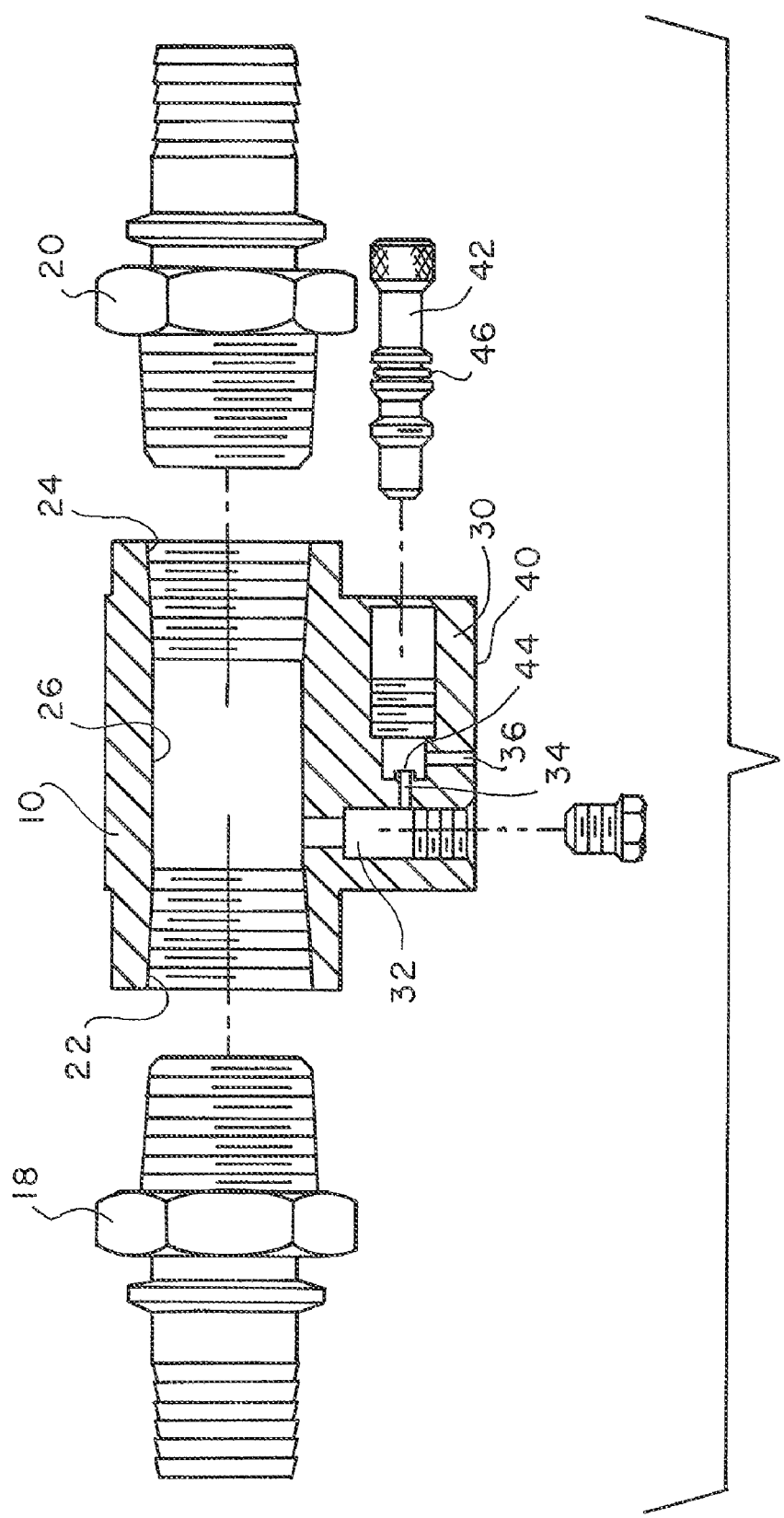
FIG. 5 is an exploded view of the hose bend bleeder and tube fittings.

Referring to FIGS. 1-5, where like numerals refer to like and corresponding parts, a hose bend bleeder 10 is combined with first and second hoses 12 and 14. First hose 12 has an end 16 connected to a first hose fitting 18. First hose fitting 18 is at the same vertical elevation as end 16 and lower than the remainder of first hose 12. Second hose 14 has an end 19 connected to a second hose fitting 20. Second hose fitting 20 is at the same vertical elevation as end 19 and lower than the remainder of second hose 14. Ends 16,19 and hose fittings 18,20 are all at the same elevation.

The hose bend bleeder 10 has first and second openings 22,24 connected to the first and second hose fittings 18,20, respectively, such that the hose bend bleeder 10 is located at the bottom of a bend in the flow path established by the hoses 12,14.

The hose bend bleeder 10 includes a main passageway 26 between the first and second openings 22,24. The main passageway 26 is collinear with the first and second openings 22,24 and the first and second hose fittings 18,20 to establish a linear flow path from the ends 16,19 of the hoses through the hose bend bleeder 10. The main passageway 26, first and second openings 22,24 and first and second hose fittings 18,20 are substantially equal in cross-sectional area to minimize resistance to flow through the fittings and hose bend bleeder.

The hose bend bleeder 10 includes a bleed block 30 offset in a downwards direction from the main passageway 26. The bleed block 30 includes a radial bleed passageway 32 communicating with the main passageway 26 and extending radially from the main passageway 26 in a downwards direction. The bleed block 30 further includes a horizontal bleed passageway 34 communicating with the radial bleed passageway 32 and extending horizontally from the radial bleed passageway 32. The bleed block 30 further including a vertical exit passageway 36 in communication with the horizontal bleed passageway and having an exit opening 38 at the bottom 40 of the bleed block 30.

A threaded bleed valve 42 is interposed at the connection 44 between the horizontal and vertical exit passageways 34,36 to selectively open and close communication between the horizontal and vertical exit passageways 34,36. Bleed valve 42 is sealed by o-ring 46.

In operation, the hoses and hose bend bleeder will be arranged so that the bleeder is at a low point in the bend, close to the ground, with the exit passageway in the bleed block facing down. In normal operation hose bend bleeder is sized and arranged to not interpose undue additional restriction to flow. After evacuation and prior to disconnection, any liquid remaining will puddle in the hose at the low point, which is the hose bend bleeder. The operator will position himself so his head is above the hose bend, and crack open the bleed valve so the remaining liquid, if any, is expelled downward away from his head. The bleed block being offset from the main passageway in a down direction is a visual confirmation to the operator that the hose bend bleeder is properly oriented with the exit passage way facing down.

It will be understood that each of the elements described above, or two or more together, may also find a useful application in other types of constructions differing from the type described above.

While the invention has been illustrated and described as embodied in a particular ammonia hose system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A hose bend bleeder in combination with first and second hoses, comprising:
   the hose bend bleeder being located at the bottom of a bend in a flow path established by the hoses;
   the hose bend bleeder including a main passageway to establish a flow path from ends of the hoses through the hose bend bleeder;
   the hose bend bleeder including a bleed passageway communicating with the main passageway and extending to an exit passageway, the exit passageway extending to an opening located at a lower elevation than the main passageway;
   a bleed valve interposed between the bleed and exit passageways to selectively open and close communication between the bleed and exit passageways;
   with the bleed and exit passageways being in a bleed block offset in a downwards direction from the main passageway;
   wherein the bleed passageway is a radial bleed passageway communicating with the main passageway and extending radially from the main passageway in a downwards direction, and the exit passageway is a vertical exit passageway having an exit opening at the bottom of the bleed block: and
   with the bleed block further including a horizontal bleed passageway communicating with the radial bleed passageway and extending horizontally from the radial bleed passageway to the vertical exit passageway, the horizontal bleed passageway in communication with the vertical exit passageway.

2. The hose bend bleeder of claim 1 with the bleed valve being located at a connection between the horizontal bleed passageway and vertical exit passageway.

3. A hose bend bleeder in combination with first and second hoses, comprising:
   a first hose with an end connected to a first hose fitting, the first hose fitting being at a vertical elevation lower than the first hose, and a second hose with an end connected to a second hose fitting, with the second hose fitting being at a vertical elevation lower than the second hose;
   a hose bend bleeder having first and second openings connected to the first and second hose fittings, respectively, such that the hose bend bleeder is located at the bottom of a bend in a flow path established by the hoses;
   the hose bend bleeder including a main passageway between the first and second openings, the main passageway being collinear with the first and second openings and first and second hose fittings to establish a linear flow path from the ends of the hoses through the hose bend bleeder;
   the main passageway, first and second openings and first and second hose fittings being substantially equal in cross-sectional area to minimize resistance to flow through the fittings and hose bend bleeder;
   the hose bend bleeder including a bleed block offset in a downwards direction from the main passageway, the bleed block including a radial bleed passageway communicating with the main passageway and extending radially from the main passageway in a downwards direction, the bleed block further including a horizontal bleed passageway communicating with the radial bleed passageway and extending horizontally from the radial bleed passageway, and the bleed block further including a vertical exit passageway in communication with the horizontal bleed passageway and having an exit opening at the bottom of the bleed block; and
   a bleed valve interposed at a connection between the horizontal and vertical exit passageways to selectively open and close communication between the horizontal and vertical exit passageways.

4. A hose bend bleeder, comprising:
   a hose bend bleeder having first and second openings;
   the hose bend bleeder including a main passageway between the first and second openings, the main passageway being collinear with the first and second openings to establish a linear flow path through the hose bend bleeder;
   the main passageway, first and second openings being substantially equal in cross-sectional area to minimize resistance to flow through the hose bend bleeder;
   the hose bend bleeder including a bleed block offset radially from the main passageway, the bleed block including a radial bleed passageway communicating with the main passageway and extending radially from the main passageway, the bleed block further including a parallel bleed passageway communicating with the radial bleed passageway and extending parallel to the main passageway from the radial bleed passageway, and the bleed block further including a perpendicular exit passageway perpendicular to and in communication with the parallel bleed passageway and having an exit opening at a surface of the bleed block; and
   a bleed valve interposed at a connection between the parallel bleed passageway and perpendicular exit passageway to selectively open and close communication between the bleed and exit passageways.

* * * * *